US008453235B1

(12) United States Patent
Chametzky (10) Patent No.: US 8,453,235 B1
(45) Date of Patent: May 28, 2013

(54) CONTROLLING ACCESS TO MAIL TRANSFER AGENTS BY CLIENTS

(75) Inventor: Marc S. Chametzky, McMurray, PA (US)

(73) Assignee: Oracle America, Inc., Redwood City, CA (US)

( * ) Notice: Subject to any disclaimer, the term of this patent is extended or adjusted under 35 U.S.C. 154(b) by 1276 days.

(21) Appl. No.: 11/639,696

(22) Filed: Dec. 15, 2006

(51) Int. Cl.
*G06F 21/00* (2006.01)

(52) U.S. Cl.
USPC ............... 726/22; 726/27; 726/28; 380/241; 713/156; 713/167; 713/186; 709/206; 709/229; 455/41.2; 455/406; 705/5

(58) Field of Classification Search
USPC ...................... 726/27, 22; 713/155
See application file for complete search history.

(56) References Cited

U.S. PATENT DOCUMENTS

| 5,937,161 | A  | * | 8/1999 | Mulligan et al. .............. 709/206 |
|---|---|---|---|---|
| 6,233,600 | B1 | * | 5/2001 | Salas et al. .................... 709/201 |
| 6,574,658 | B1 | * | 6/2003 | Gabber et al. ................. 709/206 |
| 6,609,138 | B1 | * | 8/2003 | Merriam ........................ 707/204 |
| 6,766,349 | B1 |   | 7/2004 | Belkin |
| 6,816,885 | B1 |   | 11/2004 | Raghunandan |
| 6,832,244 | B1 |   | 12/2004 | Raghunanadan |
| 6,965,919 | B1 |   | 11/2005 | Woods et al. |
| 6,986,037 | B1 | * | 1/2006 | Assmann ........................ 713/155 |
| 7,188,358 | B1 | * | 3/2007 | Hisada et al. .................... 726/2 |
| 7,290,035 | B2 | * | 10/2007 | Mattathil ........................ 709/206 |
| 7,302,563 | B2 | * | 11/2007 | Kobayashi et al. ............ 713/150 |
| 7,437,558 | B2 | * | 10/2008 | Fenton et al. .................. 713/170 |
| 7,634,808 | B1 | * | 12/2009 | Szor et al. ........................ 726/22 |
| 7,647,645 | B2 | * | 1/2010 | Edeki et al. ...................... 726/28 |
| 2003/0093433 | A1 | * | 5/2003 | Seaman et al. ................ 707/102 |
| 2004/0181788 | A1 | * | 9/2004 | Kester et al. ................... 717/168 |
| 2004/0201625 | A1 | * | 10/2004 | Karamchedu et al. ......... 345/752 |
| 2004/0205760 | A1 |   | 10/2004 | Foote et al. |
| 2005/0102511 | A1 | * | 5/2005 | Harris ............................ 713/167 |
| 2006/0031359 | A1 | * | 2/2006 | Clegg et al. ................... 709/206 |
| 2006/0059238 | A1 | * | 3/2006 | Slater et al. ................... 709/206 |
| 2006/0070114 | A1 |   | 3/2006 | Wood et al. |

(Continued)

OTHER PUBLICATIONS

Finin et al., "Intelligent agents meet the semantic Web in smart spaces", Internet Computing, IEEE; Publication: Nov.-Dec. 2004, vol. 8, Issue: 6; pp. 69-79.*

(Continued)

*Primary Examiner* — Morshed Mehedi
(74) *Attorney, Agent, or Firm* — Martine Penilla Group, LLP (57) ABSTRACT

Provided is a method and system for controlling access to a mail transfer agent (MTA), included in a mail server infrastructure (MSI), by a client, which is either a mail user agent (MUA) or an MTA not included in the MSI, and features determining whether to grant access to a client based upon the accesses made to this and other MTAs at the present time or in the past. To that end, the method includes receiving a request for access to the one of the plurality of mail transfer agents by the client. Access between the client and other MTAs is determined to obtain an existing access profile. A conditional access profile is developed from the existing access profile and from the request. The conditional access profile is compared against a permissible access profile to determine whether to grant the request. If it is determined that the conditional access profile does not violate the rules and criteria, the access is granted. Otherwise, access is denied. Also disclosed is a system that carries-out the functions of the method.

17 Claims, 7 Drawing Sheets

U.S. PATENT DOCUMENTS

| | | | |
|---|---|---|---|
| 2006/0085506 A1* | 4/2006 | Meyers et al. | 709/206 |
| 2006/0123476 A1* | 6/2006 | Yaghmour | 726/22 |
| 2006/0168024 A1* | 7/2006 | Mehr et al. | 709/206 |
| 2006/0168046 A1* | 7/2006 | Qureshi | 709/206 |
| 2006/0168059 A1* | 7/2006 | Chang et al. | 709/206 |
| 2006/0200820 A1 | 9/2006 | Cherkasova et al. | |
| 2006/0212871 A1 | 9/2006 | Cook | |
| 2006/0224673 A1* | 10/2006 | Stern et al. | 709/206 |
| 2007/0011463 A1* | 1/2007 | Garfinkle | 713/186 |
| 2007/0180031 A1* | 8/2007 | Stern et al. | 709/206 |
| 2007/0261116 A1* | 11/2007 | Prafullchandra et al. | 726/22 |
| 2008/0228532 A1* | 9/2008 | Gengarella et al. | 705/5 |

OTHER PUBLICATIONS

U.S. Appl. No. 11/961,434, filed Mar. 26, 2007, Duvur et al.

* cited by examiner

FIG. 7

CONTROLLING ACCESS TO MAIL TRANSFER AGENTS BY CLIENTS

BACKGROUND

This invention relates to e-mail transfer and, more particularly, to methods and apparatuses for controlling access to mail transfer agents by mail user agents and by other mail transfer agents.

The ever increasing prevalence of electronic mail (e-mail) poses significant challenges to industry and management of companies. Many important communications occur through e-mail. As a result, the need to manage the same is manifest. Failure to do so may have far reaching consequences including, but not limited to, huge financial losses. For example, a denial of service attack presents serious concerns for providers of Internet sites, because of the financial losses that may result.

Movement of e-mail messages typically occurs between a mail transfer agent (MTA) and a mail user agent (MUA), or between two different MTAs. To that end, a standard feature of all e-mail messages is its envelope, providing its originator and one or more recipients. One standard for defining for such an envelope is described by J. Klensin as "Simple Mail Transfer Protocol," RFC 2821 (April 2001) ("RFC 2821"). RFC 2821 is the standard for the transmission of e-mail messages over the Internet. This protocol is commonly referred to as SMTP. One advantage of SMTP is that sender and recipient information is transmitted along with the mail message.

SMTP is used to enqueue an e-mail message to an MTA over a TCP/IP connection. Typically, a client or a remote MTA will establish a TCP/IP connection to the local MTA, use SMTP to send the envelope sender and recipient, and then the header and body of the e-mail message, and upon confirmation from the local MTA that the e-mail message has been successfully received, terminate the TCP/IP connection. In addition, multiple recipients may be specified for a single e-mail message. It is also possible for multiple e-mail messages to be sent during a single TCP/IP connection.

Two Internet mail protocols have bee developed for receipt of e-mail messages from an MTA by an MUA. One standard is known as "Post Office Protocol version 3" ("POP3") and the other is known as "Internet Message Access Protocol version 4 revision 1" ("IMAP4$_{rev1}$"). The POP3 standard is described by M. Rose in "Post Office Protocol—Version 3" RFC 1081 (November 1988) and "Post Office Protocol—Version 3 Extended Service Offerings" RFC 1082 (November 1988). This standard allows an MUA to connect to an MTA in order to check for new e-mail messages in the mail account being accessed by the MUA and to read header information.

Unlike the POP3 standard, the IMAP4$_{rev1}$ standard does not require a client to download an e-mail message to a local directory of a client from the MTA in order to read the e-mail message. Rather, the IMAP4$_{rev1}$ standard allows a client to perform the client's mailbox functions while the e-mail message is maintained the MTA. Specifically, upon receipt of an e-mail message, the MTA stores the message in a region of a database, referred to as a mailbox for, which is designated and typically may be accessed only by, the client to which the e-mail message is directed. The client is then notified that there is a new message. The features of IMAP4$_{rev1}$ are described by in M. Crsipin in "Internet Message Access Protocol—Version—4$_{rev1}$" RFC 2060 (December 1996).

An advantage provided by each of the aforementioned mail protocols is the support of public mailing, or distribution, lists. In this manner, a client may transmit, to a collection of individual client mail addresses, an e-mail message directed to a single address. This may be achieved by an MTA employing an automated mailing list manager that uses a mail exploder to turn a single identifier for a distribution list the collection of client addresses. Alternatively, the MTA may achieved the public mailing or distribution by forwarding a single e-mail message to the distribution list on the MTA that is accessible by all client members of the list. The MTA notifies the respective clients that a message is being retained. The public distribution lists for these systems are generally maintained by an administrator. The public distribution list poses a probability that a single client can consume the resources of the MTA by a single request to transmit a message.

Thus, there is a need for a system and method to provide improved control of access to MTAs by clients.

SUMMARY OF THE INVENTION

Provided is a method and system for controlling access to a mail transfer agent (MTA) included in a mail server infrastructure (MSI) by a client, which is either a mail user agent (MUA) or an MTA not included in the MSI, and features determining whether to grant access to a client based upon the accesses made to this and other MTAs at the present time or in the past. To that end, the method includes receiving a request for access to the one of the plurality of mail transfer agents by the client. Access between the client and other MTAs is determined to obtain an existing access profile. A conditional access profile is developed from the existing access profile and from the request. The conditional access profile is compared against a permissible access profile to determine whether to grant the request. Specifically, the permissible access profile may include any number of rules and criteria that the requesting client must satisfy in order to gain access to the MTA. The conditional profile consists of relevant information concerning the client access that may be compared to the permissible profile to ensure that allowing of the request would not violate the rules and criteria that the client must satisfy in order to access the MTA. For example, rules included in the permissible profile may specify a maximum number of accesses to the MTA or any of the local MTAs for which a request to access was received. If it is determined that the conditional access profile does not violate the rules and criteria, the access is granted. Otherwise, access is denied. Also disclosed is a system that carries-out the functions of the method. Theses and other embodiments of the present invention are described more fully below.

BRIEF DESCRIPTION OF THE DRAWINGS

The present invention can be best understood by reference to the following description taken in conjunction with the accompanying figures, in which like parts may be referred to by like numerals.

DETAILED DESCRIPTION OF THE INVENTION

Figure 1:
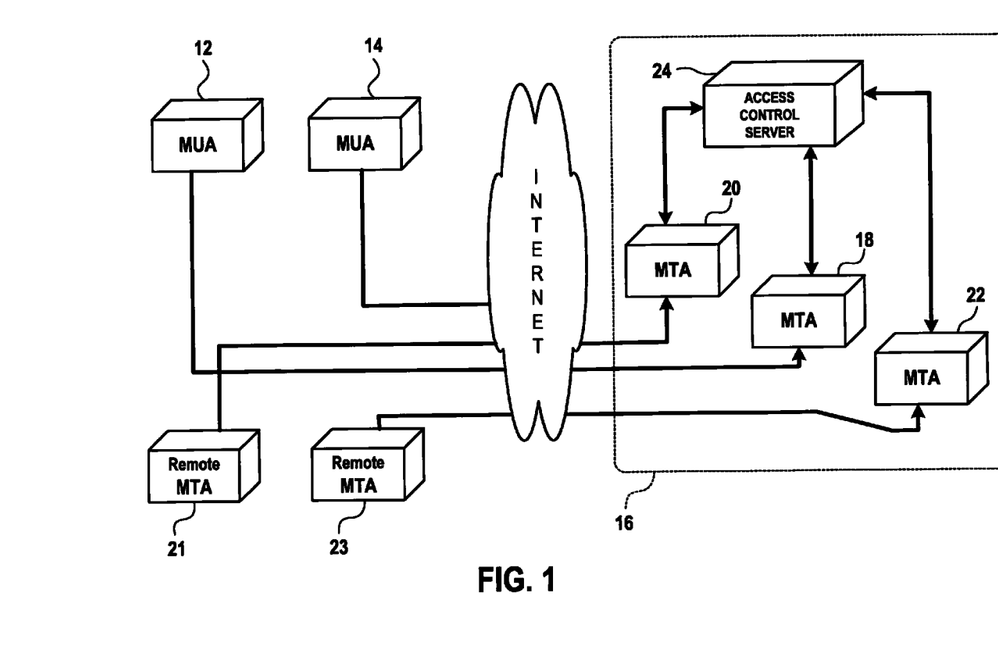
FIG. 1 illustrates an electronic mail system in which a mail server infrastructure in accordance with the present invention.

Referring to FIG. 1, an exemplary electronic mail (e-mail) system 10 in accordance with the present invention includes one or more MUAs 12 and 14, one or more remote MTAs 21 and 23, and a mail server infrastructure (MSI) 16. E-mail system 10 is structured to facilitate communication, over a network 17, with a client that is defined as either MUAs 12 and 14 and/or MTAs 21 and 23 not included in MSI 16, referred to as remote MTAs. As a result, network 17 may be any communication network known, including a local area network (LAN), a metropolitan network (MAN) and/or a wide area network (WAN), such as the Internet, or any combination of these. MSI 16 includes a plurality of mail transfer agents (MTAs) 18, 20 and 22 and an access control server 24. Although only two MUAs 12 and 14 are shown, any number may be present and may range from a one to millions. Additionally, several MSIs 16 may be in data communication with MUAs 12 and 14 over network 17. Each MSI 16 may include dozens of MTAs and central access servers 24, in addition to those shown. Additionally, MSI 16 may include one or more POP3 and/or IMAP4$_{rev1}$ servers (not shown).

Referring to both FIGS. 1 and 2 the present invention is described with reference to MUA 12, with the understanding that the description applies with equal weight to MUA 14. MUA 12 includes a memory 26, such as a random access memory (RAM) in data communication with a hard disk drive 28 or some other secondary storage device, and a central processing unit (CPU) 30 in data communication with both memory 26 and hard disk drive 28. An input device 32 is in data communication with memory 26, hard disk drive and CPU, as is a display 34. Memory 26 includes a mail user agent 36. Mail user agent 36 is a computer-readable instruction set, typically referred to as a computer program, operated on by CPU 30 to carry-out desired functions. Mail user agent 36 communicates with MSI 16 to obtain information about the messages retained on MSI 16. Mail user agent 36 also manages the delivery of messages that are stored in the hard disk drive 28. Were mail user agent 36 implementing the POP3 standard, occurs is the transfer of mail messages retained at the MSI 16 to a local mail storage region that is on hard disk drive 28.

Referring to both FIGS. 1 and 3 the present invention is described with reference to MTA 18, with the understanding that the description applies with equal weight to MTAs 20 and 22. MTA 18 includes memory 40, such as a RAM, a hard disk drive 42 in data communication therewith, as well as a CPU 44 in data communication with both memory 40 and hard disk drive 42. Also included in MTA is a multi-threaded meta-server 46, which is a set of computer-instructions in memory 40 that allows MTA 18 to facilitate incoming connections from one or more of MUAs 12 and 14 or remote MTAs 21 and 23 to internal SMTP server processes 52, POP3 server 54, or an IMAP4$_{rev1}$ server process 56. Also included in memory 40 is an operating system. Hard disk drive 42 includes a set of computer readable instructions that define a PORT_ACCESS table 50. PORT_ACCESS table 50 includes information concerning the consideration of connections between MUAs 12 and 14 or remote MTAs 21 and 23 and MTA 18 by the multi-threaded meta-server 46.

Figure 2:
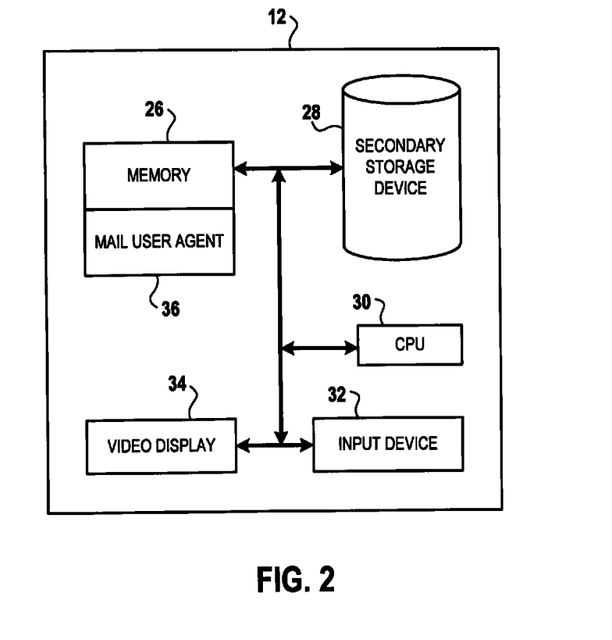
FIG. 2 is a block diagram of an exemplary system architecture for a client computer employed in the electronic mail system shown in FIG. 1 in accordance with the present invention.
Figure 3:
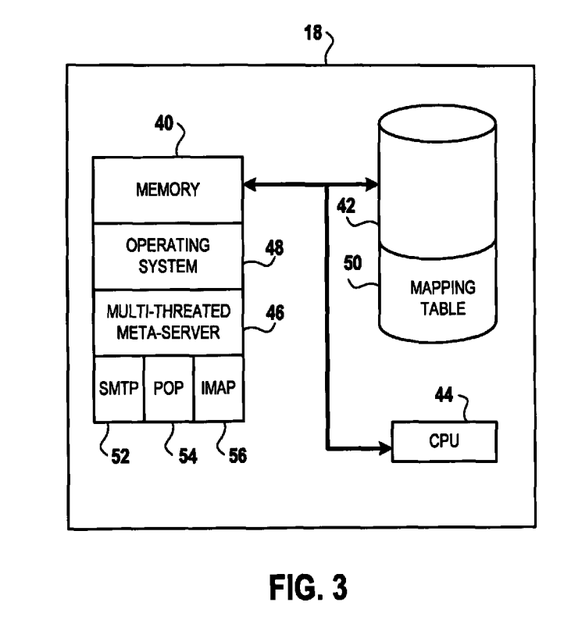
FIG. 3 is a block diagram of an exemplary system architecture employed in the mail server infrastructure, shown in FIG. 1, in accordance with the present invention.

Referring to FIGS. 1, 2 and 3, multi-threaded meta-server 46 allows MTA 18 to receive a TCP/IP connection from MUAs 12 and 14 or from remote MTAs 21 and 23. The multi-threaded meta-server 46 then facilitates the transfer of that TCP/IP connection to an SMTP server 52, POP3 server 54, or an IMAP4$_{rev1}$ server process 56 that will then communicate directly with the MUA or remote MTA over network 17.

Figure 4:
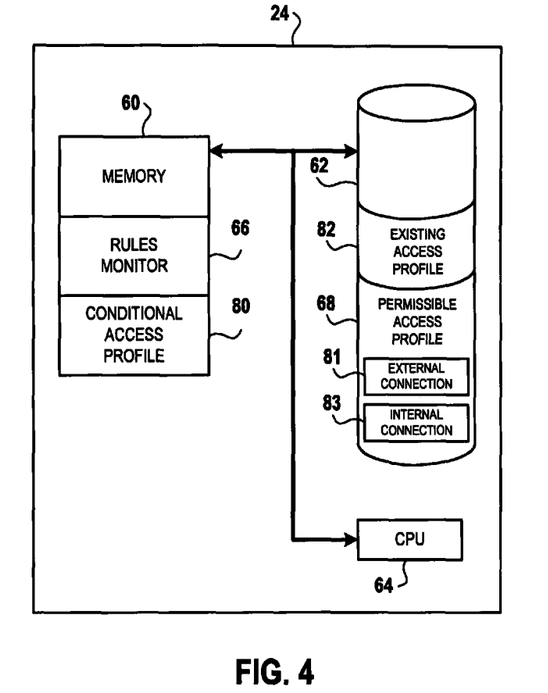
FIG. 4 is a block diagram of an access control server employed in the mail server infrastructure, shown in FIG. 1, in accordance with the present invention.

Referring to FIGS. 1 and 4, server 24 includes a memory 60, such as RAM, a hard disk drive 62 in data communication therewith, as well as a CPU 64 in data communication with both memory 60 and hard disk drive 62. Memory 60 includes a rules monitor 66. Rules monitor 66 is a set of computer-readable instructions that functions to police access of MSI 16 by MUAs 12 and 14 and remote MTAs 21 and 23 and ensure that the resources of MSI 16 is commensurate with pre-existing permissions. The pre-existing permissions are referred to as a permissible access profile 68. For example, permissible access profile 68 may include information determining how many accesses to MSI 16 may be undertaken for a given client in total over an indefinite period of time, total lifetime access, with the understanding that the total lifetime access may be zero "0". This may be the result of blacklisting, wherein a particular client is denied access to the resources of MSI 16.

Alternatively, or in addition to total lifetime access control, permissible access profile 68 may include information concerning how many times a client may connect with MSI 16 by a client during a specified period of time. These accesses include connections, e.g., TCP connections, to MSI 16 and/or transactions to MSI 16. For connection access control, permissible access profile 68 may include information concerning how many times a client may establish a connection, e.g. TCP connection, with MSI 16 independent of a given temporal duration, referred to as a client connection quota (CCQ). Alternatively, or in addition to the CCQ, the number of connections a client effectuation with MSI 16 may be limited for a specified period of time, referred to as a temporal client connection quota (TCCQ). An exemplary TCCQ may be that only 100,000 connections may be established within one minute. Were a CCQ present in permissible access profile 68 of, for example, 1 million connections, then assuming a client had undertaken to maximize the CCQ, then connections could be established for only ten minutes. Thereafter, the CCQ would have been reached, resulting in denials of any additional connections for a given client. It should be understood that multiple TCCQs may exist with or without a CCQ. For example, assuming no CCQ exists, a first TCCQ$_1$ could establish a maximum of 100 connections in a minute. A second TCCQ$_2$ could establish a maximum of 500 connections in any given hour. Information concerning TCCQ$_1$ and TCCQ$_2$ would be contained in permissible access profile 68. It should be understood that virtually any temporal arrangement may be included in permissible access profile 68. As a result a multiple TCCQs may exist.

Figure 5:
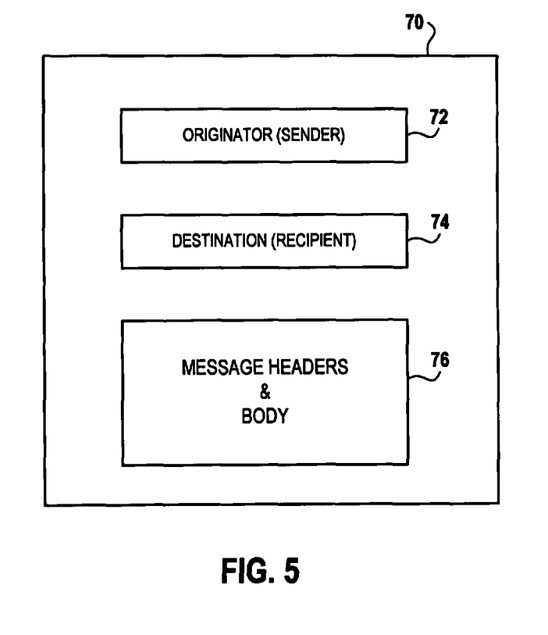
FIG. 5 is a block diagram of an exemplary electronic mail message in accordance with the present invention.

Referring to FIGS. 1 and 5, a transaction access presumes that a connection has been established and a client is attempting to employ resources of MSI 16 for receiving or sending e-mail messages. To that end, transaction access may be regulated based upon information contained in the e-mail message. A typical e-mail message 70 satisfying the RFC 2821 protocol includes information around which policing rules may be established to control access to resources of MSI 16 by a client, e.g., MUA 12. E-mail message 70 includes an originator (sender) address 72, one or more destination (recipient) addresses 74, and the message containing headers and body 76. Destination field(s) 74 contain recipient party identifier information. Destination field 74 may also contain an identifier for recipient distribution list information. Recipient distribution list information may be resolved by MSI 16 into a plurality of identifiers for individual recipient parties that are associated with members (i.e., members of the distribution list).

Therefore, employing information contained in origination field 72, control of transaction access may be implemented based upon a lifetime maximum number of e-mail messages a client, referred to as a sending party, may submit to another clients of MSI 16, independent of the identity of the recipients, referred to as a client sending quota (CSQ). The CSQ may be established independent of any temporal duration, e.g., a lifetime quota, and/or may be dependent upon a temporal duration referred to as a temporal client sending quota (TCSQ), as discussed above with respect to CCQ and TCCQ. CSQ and TCSQ information would be contained in permissible access profile 68 and typically includes Internet protocol (IP) address of the client and/or sender ID 88.

The CSQ limitations may be also be based upon the identifier of the receiving party, i.e., the information contained in destination field 74. Specifically, a CSQ and/or TCSQ may be recipient specific. As a result the CSQ and/or TCSQ may establish limitations for sending e-mail messages to a particular recipient, with no restrictions applying to the client with respect to sending e-mail messages to other recipient parties. Limitations on a number of e-mail messages that a client may submit to a particular recipient independent of any temporal limitation is referred to as a recipient sending quota (RSQ). A temporal limitation on a number of e-mail messages that a client may submit to a particular recipient is referred to as a temporal recipient sending quota (TRSQ). Both RSQ and TRSQ information would be contained in permissible access profile 68 and may include the sending party IP address, the originator 72 and/or the destination 74. It should be understood that any given client may have a permissible access profile that may include any combination of the aforementioned transaction limitations, e.g., CCQ, TCCQ, CSQ, TCSQ, RSQ and/or TRSQ.

Conversely, analogous limitations for each client may be included in permissible access profile 68 concerning receipt of information by client. Specifically, a recipient client may be limited to a maximum number of e-mail messages that may be received through MSI 16. This information is referred to as client receiving quota (CRQ), when the limitation is independent of any temporal component, and is referred to as a temporal client receiving quota (TCRQ) when a temporal component to the limitation is present. Conversely to RSQ and TRSQ information, a quota may be established in permissible access profile 68 limiting the number of e-mail messages a recipient client may receive from a particular sending client. Such a limitation independent of any temporal component is referred to as a recipient receiving quota (RRQ). A limitation having a temporal component is referred to as a temporal recipient receiving quota (TRRQ).

Referring to FIGS. 1, 2, 4 and 6 the operation of system 10 will be discussed with respect to MUA 12 seeking access to the resources of MSI 16 by communicating with MTA 18. It should be understood, however, that the discussion applies equally to MUA 12 communication with MTAs 20 and 22 and/or client communication with any of MTAs 18, 20 and 22. At function 100 MSI 16 receives a communication from MUA 12 requesting access to MTA 18. In this manner, MTA is a requested MTA and MTAs 20 and 22 are assumed to be operational in MSI 16, defining operational MTAs. Assuming no connection exists between MTA 18 and MUA 12, the access request is a connection request transmitted to operating system 46 of MTA 18. Assuming the SMTP protocol is being employed, MUA 12 transmits to MTA 18 a request for an SMTP connection. At function 102, in response to the request multi-threaded meta-server 48 accepts the SMTP connection from operating system. To that end, multi-threaded meta-server 46 refers to PORT_ACCESS access control table 50 that includes a connection sub-routine to access to check permissible access profile 68 to determine whether to grant the connection request. The permission sub-routine is referred to as check_rules.so and may transmit a request "CONNECT EXTERNAL 192.168.10.44", or some other suitable Internet protocol (IP) address that is an identifying characteristic of MUA 12, to the rules monitor 66. Additionally, each of the IP addresses mentioned above may be converted to a network address so that all addresses associated with a particularly network are considered together for purposes of determining the quota. Similarly, only the domain level of each originator 72 may be examined so that all sending parties with a common domain are considered together for purposes of determining the quota. Also only the domain level of each destination 74 may be examined so that all receiving parties with a common domain may be considered together for purposes of determining the quota.

Figure 6:
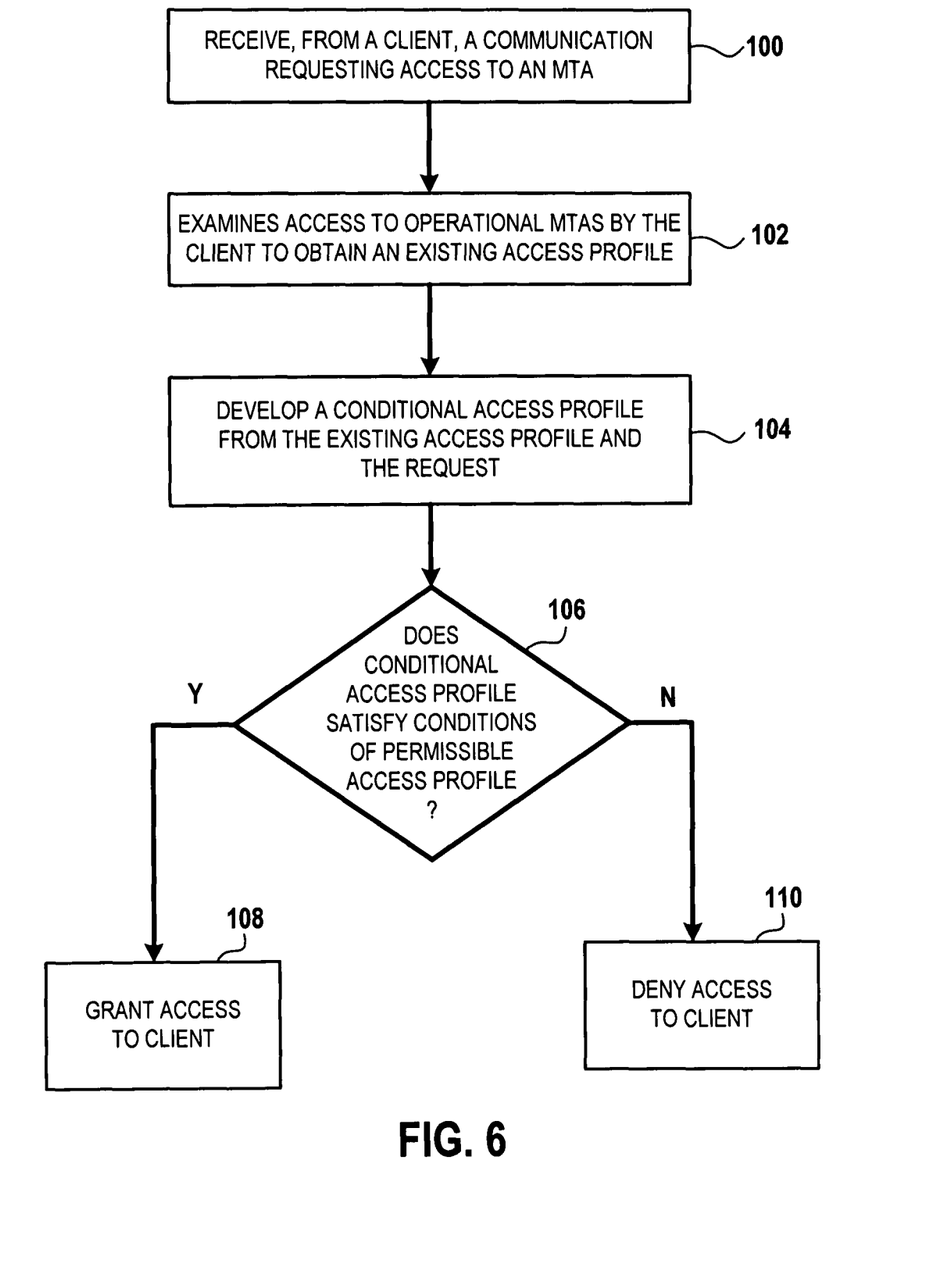
FIG. 6 is a flow chart of the showing control of connections formed between a client and a mail system, in accordance with one embodiment of the present invention.

The connection subroutine establishes a connection with rules monitor 66. Rules monitor 66 commences a permission sub-routine to determine whether the connection access received froth MUA 12 may be granted. For example, permission sub-routine refers to an EXTERNAL CONNECTION table 81 of permissible access profile 68 to determine whether the connection request for MUA 12 may be granted. At function 104, rules monitor 66 generates a conditional access profile 80 in memory 60 that includes information concerning pre-existing connections between MSI 16 and MUA 12, as well as concurrent connection requests transmitted to MSI 16 from MUA 12. For example, it may be that MUA 12 concurrently transmitted a connection request of MTA 20 and/or MTA 22 when transmitted a connect request to MTA 18. Server 24 provides the benefit of having all access requests for all MUAs 12 and 14 centrally located. Specifically, hard disk drive 62 and/or memory include an existing access profile 82 for each MUA 12 and 14 that include information concerning the connections and transactions occurring between each MUA 12 and 14 and MSI 16.

The benefit of this configuration is that conditional access profile 80 may be generated using information concerning existing access profile 82 and the access request, in this example a connection request, to determine whether MUA 12 has exhausted the resources of MSI 16 to which it has a right to access. To that end, rules monitor 66 accesses existing access profile 82 for MUA 12 and augments that same in accordance with the access request. In the present example, the number of connections to MSI 16 by MUA 12 identified in existing access profile 82 information is increased by one and this information is stored as a conditional access profile 80 for MUA 12. At function 106 conditional access profile 80 for MUA 12 is compared with the permissible access profile 68 in hard disk drive 62. Were it determined that the conditional access profile 80 satisfied the limitations in permissible access profile 68, the access would be granted to MUA 12 at function 108. In this example, the number of connections present in the conditional access profile information is compared with the CCQ in the permissible access profile information and determined that the quota is not exceeded by the conditional access profile. As a result, a positive result is returned to the permission sub-routine, and multi-threaded meta-server 46, in the PORT_ACCESS access control table 50, continues processing the PORT_ACCESS access control for any subsequent access tests. Assuming no other instances in PORT_ACCESS table 50 denies the connection between MUA 12 and MTA 18, multi-threaded meta-server 46 proceeds with normal handling of the connection.

Were it determined that the conditional access profile failed to satisfy the limitations in the permissible access profile, the access would be denied to MUA 12 at function 110. In this example, the number of connections present in the conditional access profile information is compared with the CCQ in the permissible access profile information and determined that the quota is exceeded by the conditional access profile. As a result, multi-threaded meta-server 46 in the PORT_ACCESS access control table 50 generates an SMTP failure message indicating to client 12 that the connection has failed and to try again later. An exemplary message may be as follows: "421 Connection declined at this time". Multi-threaded meta-server 46 closes the SMTP connection. It should be readily apparent that TCCQ, CSQ, TCSQ, RSQ and/or TRSQ operations may be carried out in a manner similar to the CCQ operation discussed with respect to FIG. 6.

Figure 7:
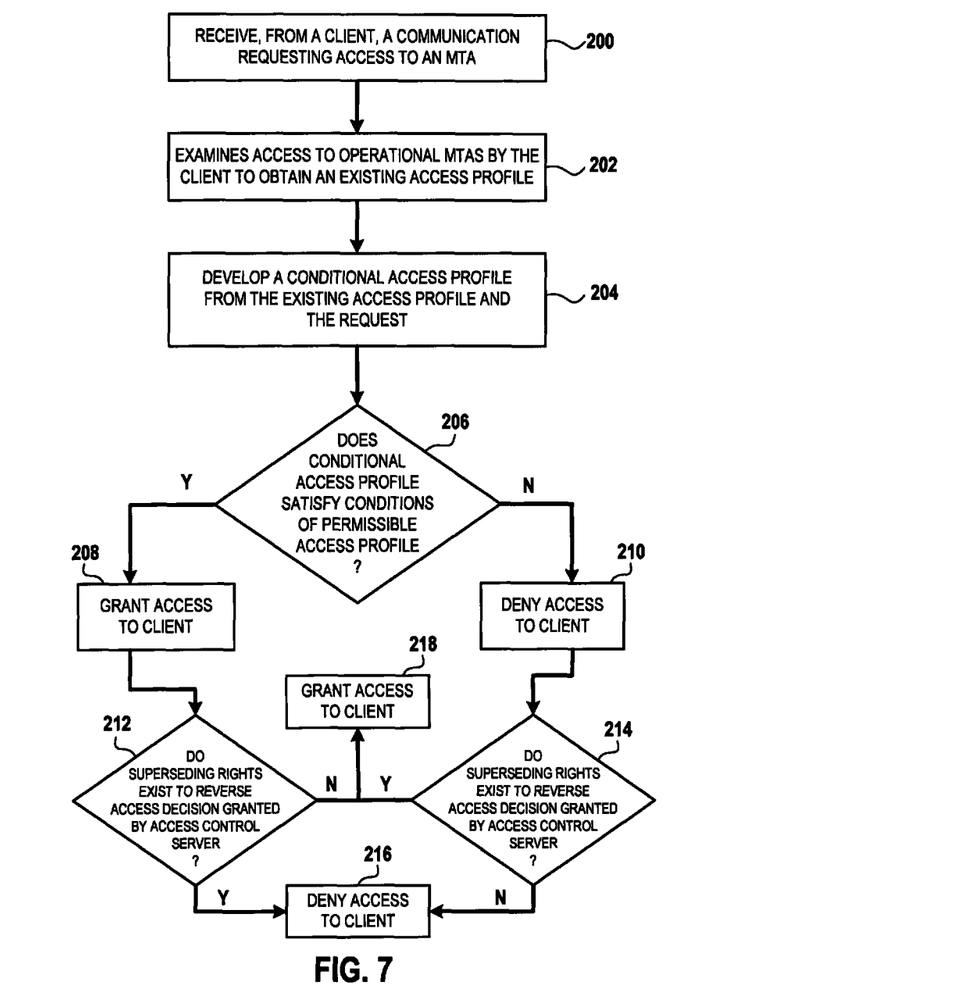
FIG. 7 is a flow chart of the showing control of connections formed between a client and a mail system, in accordance with one embodiment of the present invention.

Referring to both FIGS. 3 and 7, an additional advantage provided by the present invention is that multi-threaded meta-server 46 may include decision making functionality that facilitates access control to MTA 18, independent of access control server 24. For example, functions 200, 202, 204, 206, 208 and 210 are identical to functions 100, 102, 104, 206, 208 and 210, respectively. Assuming, following 206 each function 208 and 210, another decision is determined as to whether superseding priorities are in existent. Specifically, assume at function 206 it is determined that the conditional access profile failed to satisfy the conditions of the permissible access profile, then at function 214, following function 210, multi-threaded multi-server 26 determines whether superseding rights warrant reversing the access decision granted by access control server 24. Were this the case, then the process would proceed to function 218; otherwise, the process proceeds to function 216. Conversely, were function 206 to determine that the conditional access profile satisfied the conditions of the permissible access profile, then at function 212, following function 208, multi-threaded multi-server 26 would determine whether superseding rights warrant reversing the access decision granted by access control server 24. Were this the case, process would proceed to function 216; otherwise, the process proceeds to function 218.

Referring to FIGS. 1 and 7, exemplary superseding rights would be an early denial of service to the requesting client. This could be in response to a previous denial of access in which the requesting client was instructed to try again later or a response to a previous denial of access in which the requesting client was instructed to try again after a predetermined lapse of time. This is typically referred to as grey-listing. With respect to the latter, were the requesting client attempting to obtain access to MTA 18 before the predetermined lapse of time, function 216 would occur, regardless of whether the conditional access profile satisfied the condition of the permissible access profile. Otherwise, function 218 would occur. The advantage of this configuration is that it allows individual MTA 18 to have local control over the access by clients, thereby providing greater flexibility of access by the in the overall MSI 16. In each occurrence of the access decision being reversed by MTA 18 notifies access control server 24 so that existing access profile 82 is updated indicating that MTA 18 has either granted or denied access to the request client. In this manner, an accurate existing access profile 82 is maintained concerning each client that is available to all MTAs 18, 20, 21, 22 and 23. It should be noted that no notification to central access server is provided by MTA 18 if there is no reversal of the access determination made by access control server 24.

Although exemplary embodiments have been described, various modifications can be made without departing from the spirit and/or scope of the present invention. For example, the foregoing discussion concerning communication between MUA 12 or 14 and MSI 16 applies equally to communication between remote MTAs 21 or 23 and MSI 16. Therefore, the present invention should not be construed as being limited to the specific forms shown in the drawings and described above.

What is claimed is:

1. A method of controlling access between a client and one of a plurality of mail transfer agents (MTAs) coupled to a server, said method comprising operations of:

receiving a request for access to said one of said plurality of mail transfer agents by said client, defining a requested mail transfer agent, with remaining mail transfer agents defining operational mail transfer agents, wherein receiving further includes receiving by one of said plurality of mail transfer agents, with said one of said plurality of mail transfer agents including a multi-threaded meta-server looking to a access control table to transmit a status check to said server having a rules monitor;

examining accesses between said client and said requested and operational mail transfer agents to obtain an existing access profile, with examining further including having said rules monitor examining a profile table that includes information concerning said existing access profile;

developing a conditional access profile from said existing access profile and said request, with developing having said rules monitor read said existing profile and augment the same with information concerning said request;

comparing said conditional access profile with a permissible access profile to determine whether to grant said request, with comparing further including having said rules monitor compare said conditional access profile with said permissible access profile, wherein the determination is based at least in part on a quota in the permissible access file that is selected from the group consisting of recipient sending quotas and temporal recipient sending quotas, wherein the determination is subject to superseding rights from a previous denial of access that set a predetermined lapse of time, and wherein each operation of the method is executed by a processor.

2. The method as recited in claim 1 wherein receiving further includes receiving a connection request and examining further includes examining connections between said client and said requested and operational mail transfer agents to obtain an existing connection profile and developing further includes developing a conditional connection profile from said existing connection profile and said connection request and comparing further includes comparing said conditional connection profile with a permissible connection profile to determine whether to grant said request.

3. The method as recited in claim 1 wherein receiving further includes receiving a transaction request and examining further includes examining transactions between said client and said requested and operational mail transfer agents to obtain an existing transaction profile and developing further includes developing a conditional transaction profile from said existing transaction profile and said transaction request and comparing further includes comparing said conditional transaction profile with a permissible transaction profile to determine whether to grant said request.

4. The method as recited in claim 1 wherein receiving further includes receiving a recipient request to receive a mail message for a recipient and examining further includes examining previous mail receipt transactions between said client and said requested and operational mail transfer agents to obtain an existing mail receipt transaction profile and developing further includes developing a conditional mail receipt transaction profile from said existing mail receipt transaction profile and said recipient request and comparing further includes comparing said conditional mail receipt transaction profile with a permissible mail receipt transaction profile to determine whether to grant said request.

5. The method as recited in claim 1 wherein receiving further includes receiving a send request to send a mail message to a recipient and examining further includes examining previous sending transactions between said client and said requested and operational mail transfer agents to obtain an existing sending transaction profile and developing further includes developing a conditional sending transaction profile from said existing sending transaction profile and said send request and comparing further includes comparing said conditional sending transaction profile with a permissible sending transaction profile to determine whether to grant said request.

6. The method as recited in claim 1 wherein receiving further includes receiving by one of said plurality of MTAs, with said one of said plurality of MTAs including an SMTP, POP3, or IMAP4$_{rev1}$ server looking to a access control table to transmit a status check to said server having a rules monitor, with examining further including having said rules monitor examining a profile table that includes information concerning said existing profile, with developing having said rules monitor read said existing profile and augment the same with information concerning said request, and comparing further including having said rules monitor compare said conditional access profile with said permissible access profile.

7. The method as recited in claim 1 further including transmitting, with said rules monitor, a denial of access to said multi-threaded meta-server, with said multi-threaded meta-server recording said denial and transmitting a grant of access message to said client in response to superseding rights.

8. The method as recited in claim 1 further transmitting, with said rules monitor, a grant of access to said multi-threaded meta-server, with said multi-threaded meta-server transmitting a denial of access message to said client in response to superseding rights.

9. A mail system for communication with a client, said system comprising:
a plurality of mail transfer agents (MTAs), a subset of which includes a multi-threaded meta-server and a mapping table; and
a server, in data communication with said plurality of MTAs, said server including a rules monitor, and a profile table including information that defines a permissible access profile for said client and an existing access profile for said client, said existing access profile including access information of said client to said plurality of MTAs, said multi-threaded meta-server to selectively communicate with said rule monitor to determine whether access to one of said plurality of MTAs in response to a request by said client is permissible, wherein the determination is based at least in part on a quota in the permissible access file that is selected from the group consisting of recipient receiving quotas and temporal recipient receiving quotas and wherein the determination is subject to superseding rights from a previous denial of access that set a predetermined lapse of time, wherein said rules monitor reads said profile table to obtain existing profile information associated with said client and augments said existing profile information to develop a conditional access profile and compares said conditional access profile to said permissible access profile to determine whether access to said one of said plurality of MTAs by said client is granted, and wherein said server includes a memory, a hard disk drive, and a CPU in communication with the memory and the hard disk drive.

10. The system as recited in claim 9 wherein said mapping table further includes use of a dynamically loaded shared library to communicate with said server and have said rules monitor determine whether said access may be granted.

11. The system as recited in claim 9 wherein said access is selected from a set of accesses consisting essentially of a TCP connection access, a mail transmit access and a mail receive access.

12. A computer-readable medium, which in non-transitory, having stored thereon a computer-readable instructions to control access between a client and one of a plurality of mail transfer agents, said computer-readable medium comprising:
code to receive a request for access to said one of said plurality of mail transfer agents by said client, defining a requested mail transfer agent, with remaining mail transfer agents defining operational mail transfer agents, wherein receiving further includes receiving by one of said plurality of mail transfer agents, with said one of said plurality of mail transfer agents including a multi-threaded meta-server looking to a access control table to transmit a status check to said server having a rules monitor;
code to examine accesses between said client and said operational mail transfer agents to obtain an existing access profile, with examining further including having said rules monitor examining a profile table that includes information concerning said existing profile;
code to develop a conditional access profile from said existing access profile and said request, with developing having said rules monitor read said existing profile and augment the same with information concerning said request; and
code to compare said conditional access profile with a permissible access profile to determine whether to grant said request, with comparing further including having said rules monitor compare said conditional access profile with said permissible access profile, wherein the determination is based at least in part on a quota in the permissible access file that is selected from the group consisting of recipient receiving quotas and temporal recipient receiving quotas, and wherein the determination is subject to superseding rights from a previous denial of access that set a predetermined lapse of time.

13. The non-transitory computer-readable medium as recited in claim 12 wherein said code to receive further includes a first sub-routine to receive a connection request and said code to examine further includes a second subroutine examine connections between said client and said operational mail transfer agents to obtain an existing connection profile and said code to develop further includes a third sub-routine to develop a conditional connection profile from said existing connection profile and said connection request and said code to compare further includes a fourth sub-routine to compare said conditional connection profile with a permissible connection profile to determine whether to grant said request.

14. The non-transitory computer-readable medium as recited in claim 12 wherein said code to receive further includes a first sub-routine to receive a transaction request and said code to examine further includes a second sub-routine to examine transactions between said client and said operational mail transfer agents to obtain an existing transaction profile and said code to develop further includes a third sub-routine to develop a conditional transaction profile from said existing transaction profile and said transaction request and said code to compare further includes a fourth sub-routine to compare said conditional transaction profile with a permissible transaction profile to determine whether to grant said request.

15. The non-transitory computer-readable medium as recited in claim 12 wherein said code to receive further includes a first sub-routine to receive a recipient request to receive a mail message for said client and said code to examine further includes a second sub-routine to examine previous mail receipt transactions between said client and said operational mail transfer agents to obtain an existing mail receipt transaction profile and said code to develop further includes a third sub-routine to develop a conditional mail receipt transaction profile from said existing mail receipt transaction profile and said recipient request and said code to compare further includes a fourth sub-routine to compare said conditional mail receipt transaction profile with a permissible mail receipt transaction profile to determine whether to grant said request.

16. The non-transitory computer-readable medium as recited in claim 12 wherein said code to receive further includes receiving a request send a mail message to a recipient and examining further includes examining previous sending transactions to obtain an existing sending transaction profile and developing further includes developing a conditional sending transaction profile from said existing sending transaction profile and comparing further includes comparing said conditional sending transaction profile with a permissible sending transaction profile to determine whether to grant said request.

17. The non-transitory computer-readable medium as recited in claim 12 further including code to transmit a denial of access to said client.

\* \* \* \* \*